US006936991B2

(12) United States Patent
Chen et al.

(10) Patent No.: US 6,936,991 B2
(45) Date of Patent: Aug. 30, 2005

(54) METHOD AND APPARATUS FOR MOTOR CONTROL

(75) Inventors: Li Chen, Livonia, MI (US); Roy I. Davis, Saline, MI (US); Stephen Stella, Northville, MI (US); Tod R. Tesch, Novi, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 151 days.

(21) Appl. No.: 10/449,824

(22) Filed: May 30, 2003

(65) Prior Publication Data

US 2004/0036434 A1 Feb. 26, 2004

Related U.S. Application Data

(60) Provisional application No. 60/385,469, filed on Jun. 3, 2002.

(51) Int. Cl.$^7$ .............................................. H02P 21/00
(52) U.S. Cl. ........................ 318/700; 318/254; 318/138; 318/439
(58) Field of Search ................................ 318/700–724, 318/138, 254, 439, 811, 802, 805, 432–434, 798, 799, 723, 716, 812

(56) References Cited

U.S. PATENT DOCUMENTS

| | | | | |
|---|---|---|---|---|
| 5,343,970 A | * | 9/1994 | Severinsky ................ 180/65.2 |
| 5,481,168 A | * | 1/1996 | Mutoh et al. ................ 318/432 |
| 5,689,166 A | * | 11/1997 | Nagayama et al. ......... 318/721 |
| 6,163,128 A | * | 12/2000 | Hiti et al. .................... 318/722 |
| 6,194,865 B1 | | 2/2001 | Mitsui et al. ................ 318/811 |
| 6,239,575 B1 | * | 5/2001 | Xu et al. ..................... 318/801 |
| 6,288,515 B1 | * | 9/2001 | Hiti et al. .................... 318/722 |
| 6,304,052 B1 | * | 10/2001 | O'Meara et al. ............ 318/700 |
| 6,504,329 B2 | * | 1/2003 | Stancu et al. ............... 318/254 |
| 6,573,745 B2 | * | 6/2003 | Raftari et al. ............... 318/254 |
| 2003/0173921 A1 | * | 9/2003 | Nakazawa ................... 318/432 |
| 2004/0100221 A1 | * | 5/2004 | Fu .............................. 318/700 |

OTHER PUBLICATIONS

Chen, L. et al., "Improved Control Techniques for IPM Motor Drives On Vehicle Application," in *Proceedings of the 37$^{th}$ IAS Annual Meeting: Industry Applications Conference*, Oct. 13–18, 2002, vol. 3, pp. 2051–2056.

Jahns, T., *Power Electronics and Variable Frequency Drives—Technology and Applications* IEEE Press, Piscataway, NJ, 1997, Chap. 6, "Variable Frequency Permanent Magnet AC Machine Drives," pp. 277–331.

Macminn, S. et al., "Control Techniques for Improved High–Speed Performance of Interior PM Synchronous Motor Drives," *IEEE Transactions on Industry Applications* 27(5):997–1004, Sep./Oct. 1991.

* cited by examiner

*Primary Examiner*—David Martin
*Assistant Examiner*—Eduardo Colon Santana
(74) *Attorney, Agent, or Firm*—Seed IP Law Group PLLC (57) ABSTRACT

A closed-loop permanent magnet motor control method and system optimally partitions torque and flux-weakening currents to produce a desired torque without exceeding the capability of the DC source. A maximum limit for allowable torque current and a minimum threshold for the maximum torque current are determined, and the flux current is varied based at least in part on whether the maximum torque current limit is above or below the minimum threshold while operating in a flux-weakening region to compensate for the variability of the DC source voltage.

30 Claims, 10 Drawing Sheets

METHOD AND APPARATUS FOR MOTOR CONTROL

BACKGROUND OF THE INVENTION

1. Field of the Invention

The present invention generally relates to motor control and more particularly relates to a partitioning of torque and flux currents ($I_q$, $I_d$) supplied from a DC source when operating a permanent magnet (PM) motor, for example, in a constant power range.

2. Description of the Related Art

The PM synchronous motor possesses many appealing characteristics for various applications, including pure-electric and hybrid-electric vehicles. The maximum input power of a vehicle is dictated by the size of the source (i.e. battery, fuel cell engine, supercapacitor, etc.) and is the product of the DC voltage and DC current. Quite often, the DC bus voltage varies with motor output power (i.e., Torque*Speed). As a result, rapid changes in vehicle load may cause large fluctuations in the DC bus voltage. A traction electric motor drive is often required to perform over a wide operating range. Typically the operating range of an electric machine such as a traction electric motor is divided into two regions: the constant torque region and the constant power region. It is important to maintain the ability to change between both modes of operation quickly and smoothly.

Existing PM motor control, particularly in vehicle applications, performs poorly when the DC bus voltage varies. Rapid fluctuation of the DC bus voltage, for example due to rapidly changing power demands, exacerbates this problem, and existing PM control systems are typically unable to adequately compensate. Fast switching between these two regions requires an improved current regulation methodology and apparatus.

BRIEF SUMMARY OF THE INVENTION

Proper current partitioning between the flux and torque currents is important to produce the desired torque while avoiding commanding voltages beyond the instantaneous capability of the DC source. If the current is partitioned incorrectly, the motor will not be able to produce the desired torque. To address this issue, a closed-loop flux-weakening control system and method to partition the current optimally between the torque and flux-weakening currents to produce the desired torque without exceeding the capability of the DC source are disclosed. The control system and method shows superior stability of the dynamic performance during high-speed operation (i.e., constant power range) as compared to performance results previously published. Thus, the present invention provides a way to regulate and partition the current so as to improve the performance of a PM motor over an extended speed range.

In one aspect, a method and a system allows the setting and controlling of a minimum threshold of the maximum torque current allowed while operating in a flux-weakening region. This minimum threshold compensates for the variability of the DC source voltage and ensures a smooth torque response because the torque current regulates the flux current.

The method determines a maximum limit for the allowable torque current (IqMaxCalc), while also determining a minimum threshold (IqMaxBottomLine) for this maximum torque current limit to compensate for the DC source variability. If the maximum torque current limit (IqMaxCalc) is greater than the minimum threshold (IqMaxBottomLine), then the limit, IqMax, equals IqMaxCalc. If, however, the minimum threshold IqMaxBottomLine is greater than IqMaxCalc, the magnitude of the flux current is increased by the output of a first proportional-plus-integral (PI) controller. The increase in the magnitude of the flux current allows the maximum torque current limit IqMaxCalc to increase until it equals the minimum threshold IqMaxBottomLine.

If the demanded torque current (Iq*) is higher than the maximum torque current limit (IqMax), then the magnitude of the flux current is increased by adding together the peak-torque-per-amp (PTPA) component of the flux current and the output of a second proportional-plus-integral (PI) controller. This PI controller operates on the difference between the demanded torque current (Iq*) and the commanded torque current (Iq_req) and ensures that Iq* does not exceed IqMax. These features allow the motor to continue to produce torque smoothly and at the maximum capability of the motor, while transitioning into and out of the flux-weakening region at whatever rate is dictated by the DC source variation.

Further aspects and advantages of the present invention will be more readily apparent to those skilled in the art during the course of the following description, references being made to the accompanying drawings which illustrate preferred forms of the present invention.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements, as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with PM motors, controllers, microprocessors, and various electrical components have not been shown or described in detail to avoid unnecessarily obscuring descriptions of the embodiments of the invention.

Unless the context requires otherwise, throughout this specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Glossary of Symbols

Figure 1:
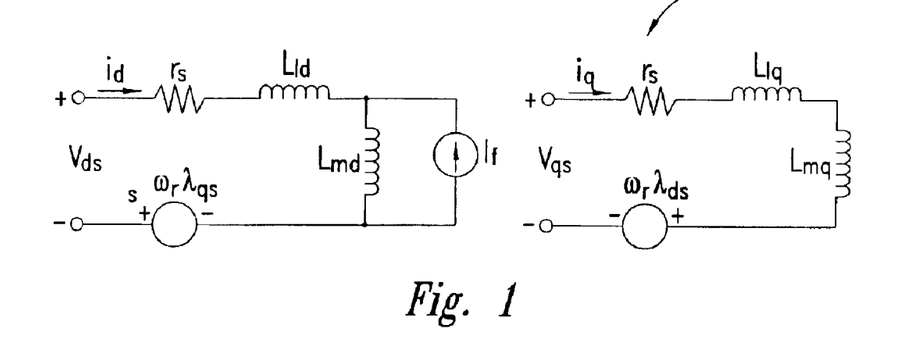
FIG. 1 is an equivalent circuit diagram for the PM machine expressed in the orthogonal d- and q-axes. This figure defines the d- and q-axis currents and voltages.

The following symbols, related to a PM motor, appear in the description that follows:

$F_w$ = windage and friction factor
$i_d^*$ = flux current command
$i_q^*$ = torque current command
$i_d$ = flux current
$i_q$ = torque current
$i_s$ = stator phase current
$i_q^{Max}$ = maximum torque current
J = polar moment of inertia of the motor rotor
$L_d$ = d-axis stator inductance
$L_{ld}$ = d-axis stator leakage inductance
$L_{lq}$ = q-axis stator leakage inductance
$L_{md}$ = d-axis magnetizing inductance
$L_{mq}$ = q-axis magnetizing inductance
$L_q$ = q-axis stator inductance
p = operator indicating mathematical differentiation with respect to time
P = number of pairs of poles
$r_s$ = stator resistance
$T_e$ = PM motor generated airgap torque
$T^*$ = torque command
$T_L$ = load torque
$V_{DC}$ = DC bus voltage
$\lambda_d$ = d-axis stator flux linkage
$\lambda_q$ = q-axis stator flux linkage
$\lambda_{PM}$ = permanent magnet rotor flux
$v_d$ = d-axis stator voltage
$v_q$ = q-axis stator voltage
$\omega_r$ = synchronous speed
$\omega_{rm}$ = rotor mechanical speed PM Motor Model The most convenient manner of analyzing a sinusoidal permanent magnet alternating current ("PMAC") machine uses the instantaneous current, voltage and flux linkage vectors in a synchronously rotating reference frame locked to the rotor. The d-axis has been aligned with the permanent magnet flux linkage vector so that the orthogonal q-axis is aligned with the resulting back-EMF vector. The equivalent circuit 1 for a PM motor can be developed for dq-axes as shown in FIG. 1.

The d-q axis model of a PM motor with the reference axes rotating at synchronous speed ($\omega_r$) is:

$$v_{ds} = r_s i_d + p\lambda_{ds} - \omega_r \lambda_{qs}; \tag{1}$$

$$v_{qs} = r_s i_q + p\lambda_{qs} + \omega_r \lambda_{ds}; \tag{2}$$

where:

$$\lambda_{ds} = L_d i_d + \lambda_{PM} = (L_{ld} + L_{md})i_d + \lambda_{PM}; \tag{3}$$

$$\lambda_{qs} = L_q i_q = (L_{lq} + L_{mq})i_q. \tag{4}$$

Rotor mechanical speed is determined according to:

$$p\omega_r = P(T_e - T_L - F_w \omega_r)/J. \tag{5}$$

Motor torque is determined according to:

$$T_e = (3P/2)(\lambda_{PM} i_q + i_d i_q (L_d - L_q)). \tag{6}$$

and power is found as:

$$\text{Power}_{input} = (3/2)(v_{ds} i_d + v_{qs} i_q); \tag{7}$$

$$\text{Power}_{output} = T_e \omega_{rm}; \tag{8}$$

where:

$$\omega_{rm} = \omega_r / P. \tag{9}$$

Control System Model

Since the constant power range is very important for traction drive systems, an improved flux-weakening control method is implemented, while a peak torque per ampere ("PTPA") method is employed for the constant torque region. With reference to FIGS. 8A–8D, the control system consists of five major subsystems:

1) Command Torque subsystem enclosed in broken-line box 8,
2) Reference d-q Voltage subsystem enclosed in broken-line box 4,
3) Torque Current Command subsystem enclosed in broken-line box 7,
4) Flux Current Command subsystem enclosed in broken-line box 5, and
5) Maximum Torque Current subsystem enclosed in broken-line box 6.

Peak Torque Per Ampere (PTPA)

As shown in equation (6), the torque of the PM primarily depends on the $i_d$ and $i_q$ currents. From the equivalent circuit, the phase current can be expressed as:

$$i_s = \sqrt{i_d^2 + i_q^2}; \tag{10}$$

thus, equation (6) can alternatively be expressed as:

$$T_e = (3P/2)(\lambda_{PM} i_q + i_q \sqrt{i_s^2 - i_q^2}(L_d - L_q)). \tag{11}$$

Figure 2:
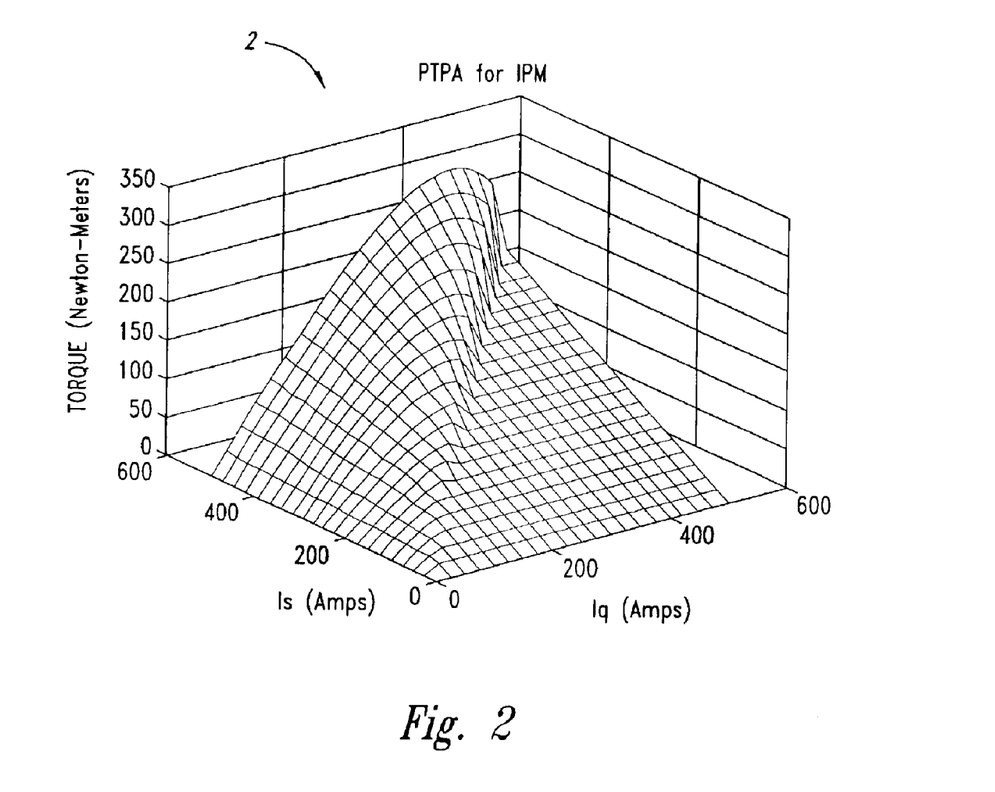
FIG. 2 is a 3-D chart showing that, for a given phase current in a typical traction motor, the peak torque per ampere can be found by varying the distribution of $i_q$ and $i_s$.
Figure 3:
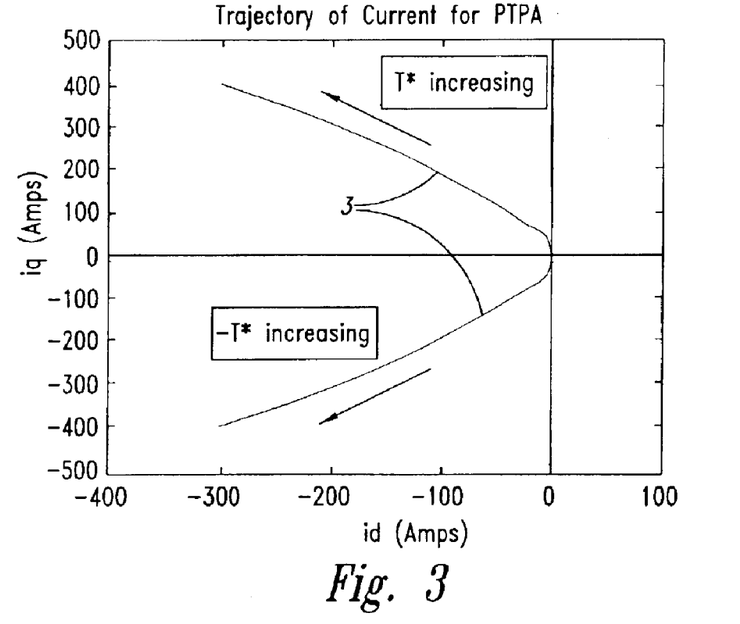
FIG. 3 is a graph showing the trajectory of currents for peak torque per ampere of an improved PM according to one embodiment of the present invention.

For a given phase current, the peak torque per ampere can be found by varying the distribution of $i_d$ and $i_q$. FIG. 2 shows a typical example of the peak torque per ampere distribution 2 for a given phase current in an exemplary PM machine. FIG. 3 shows a trajectory of currents 3 for peak torque per ampere of an IPM according to one embodiment. FIGS. 2 and 3 are exemplary of a peak torque per ampere distribution and trajectory of currents for one possible PM machine, and thus are not intended to limit the disclosure or claims to any specific PM machine.

Unfortunately, as the rotor speed increases, the range of attainable motor currents is limited by the ability of the source voltage (i.e., DC bus voltage) to accommodate the growing motor terminal voltage due to the increasing Back-EMF voltage. At any speed, the attainable stator current component in the dq-plane lies within a voltage limit ellipse defined by:

$$\left(\frac{2V_{DC}}{\pi\omega_r L_q}\right)^2 = i_q^2 + \left(\frac{L_d}{L_q}\right)^2\left(i_d + \frac{\lambda_{PM}}{L_d}\right)^2. \quad (12)$$

Recall that the PM motor torque is defined as:

$$T_e=(3P/2)(\lambda_{PM}i_q+i_d i_q(L_d-L_q)). \quad (6)$$

Figure 4:
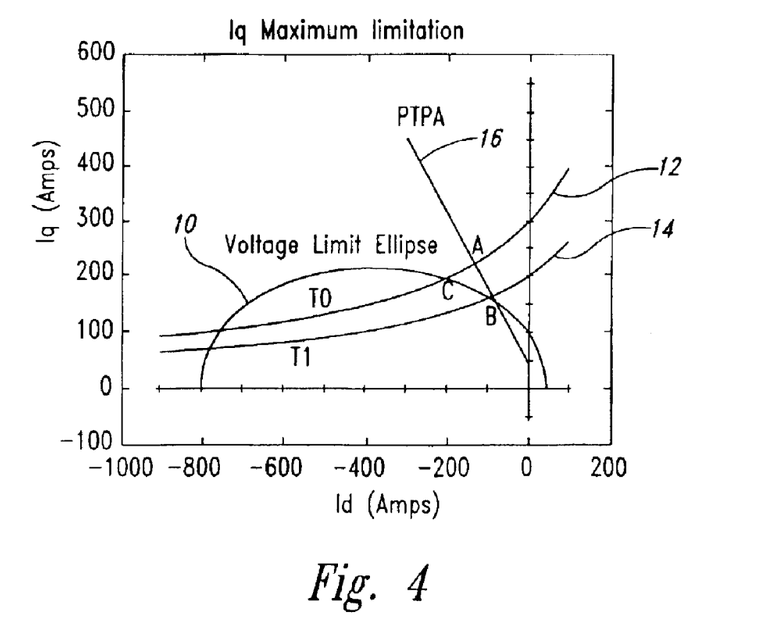
FIG. 4 is a graph showing the voltage limit ellipse in the dq-plane for a given speed and bus voltage, and also showing two constant torque surfaces and the phase current trajectory commanded by the peak torque per ampere as a function of torque command.

FIG. 4 illustrates the need to modify the current commands generated under existing peak torque per ampere (PTPA) methods during elevated speeds. FIG. 4 shows the voltage limit ellipse 10 in the dq-plane for a given speed and bus voltage. Two constant torque surfaces 12 and 14 and the phase current trajectory 16 commanded by the PTPA as a function of torque command T* are also shown.

If we assume that the reference torque commands the current defined by point "A" in FIG. 4, which corresponds to the torque $T_0$, we notice that this point falls outside of the voltage ellipse boundary 10. The system will not be able to generate the desired current since doing so requires exceeding the voltage limit. The actual operating point is forced to fall on the voltage ellipse 10 near point "B" (by PTPA trajectory), thus yielding torque $T_1$, which is less than the desired torque value $T_0$.

The new and unique flux-weakening algorithm modifies the current commands at high speed to force the $i_d$ and $i_q$ operating point to the left, along the ellipse boundary 10, to the intersection of the constant torque curve $T^*=T_0$ at point "C" in FIG. 4. At point "C", the PTPA characteristic is no longer applied.

To reach point "C", the torque current command ($i_q^*$) is limited to remain within the ellipse boundary 10 while the magnitude of the flux current command ($i_d^*$) is increased to move the operating point to the left along the ellipse boundary 10. At any given speed, bus voltage and flux current ($i_d^*$), the maximum value of torque current ($i_q^{Max}$) is given by:

$$i_q^{Max} = \sqrt{\left(\frac{2V_{DC}}{\pi\omega_r L_q}\right)^2 - \left(\frac{L_d}{L_q}\right)^2\left(i_d^* + \frac{\lambda_{PM}}{L_d}\right)^2}. \quad (14)$$

While operating at any given torque, as the motor speed increases the output power increases, the DC bus voltage is reduced according to the terminal characteristics of the DC source. At some point, the maximum torque current $i_q^{Max}$ will decrease to zero according to equation (14). To maintain a minimum torque capability of the motor, a minimum threshold (IqMaxBottomLine) of the maximum torque current limit $i_q^{Max}$ must be established to prevent the maximum torque current limit $i_q^{Max}$ from becoming zero. When the maximum torque current limit $i_q^{Max}$ exceeds IqMaxBottomLine, no limitation is applied to the maximum torque current limit $i_q^{Max}$, and the output of a first PI controller 62 FIG. 6) reduces to zero. However, if the maximum torque current limit $i_q^{Max}$ falls below IqMaxBottomLine, the first PI controller 62 will increase the magnitude of the flux current, $i_d^*$, to ensure that $i_q^{Max}$ is equal to or exceeds IqMaxBottomLine.

Command dq Voltage Calculation

During steady state operation, the $i_d$ and $i_q$ currents are not changing, thus the feed-forward voltages, VdCalc and VqCalc, are derived from the inverse voltage equations for a PM motor. These equations, previously presented in equations (1) and (2), can be simplified to:

$$v_{dCalc}=r_s i_d-\omega_r\lambda_q=r_s i_d-\omega_r L_q i_q; \quad (15)$$

$$v_{qCalc}=r_s i_q+\omega_r\lambda_d=r_s i_q+\omega_r(L_d i_d+\lambda_{PM}). \quad (16)$$

Figure 5:
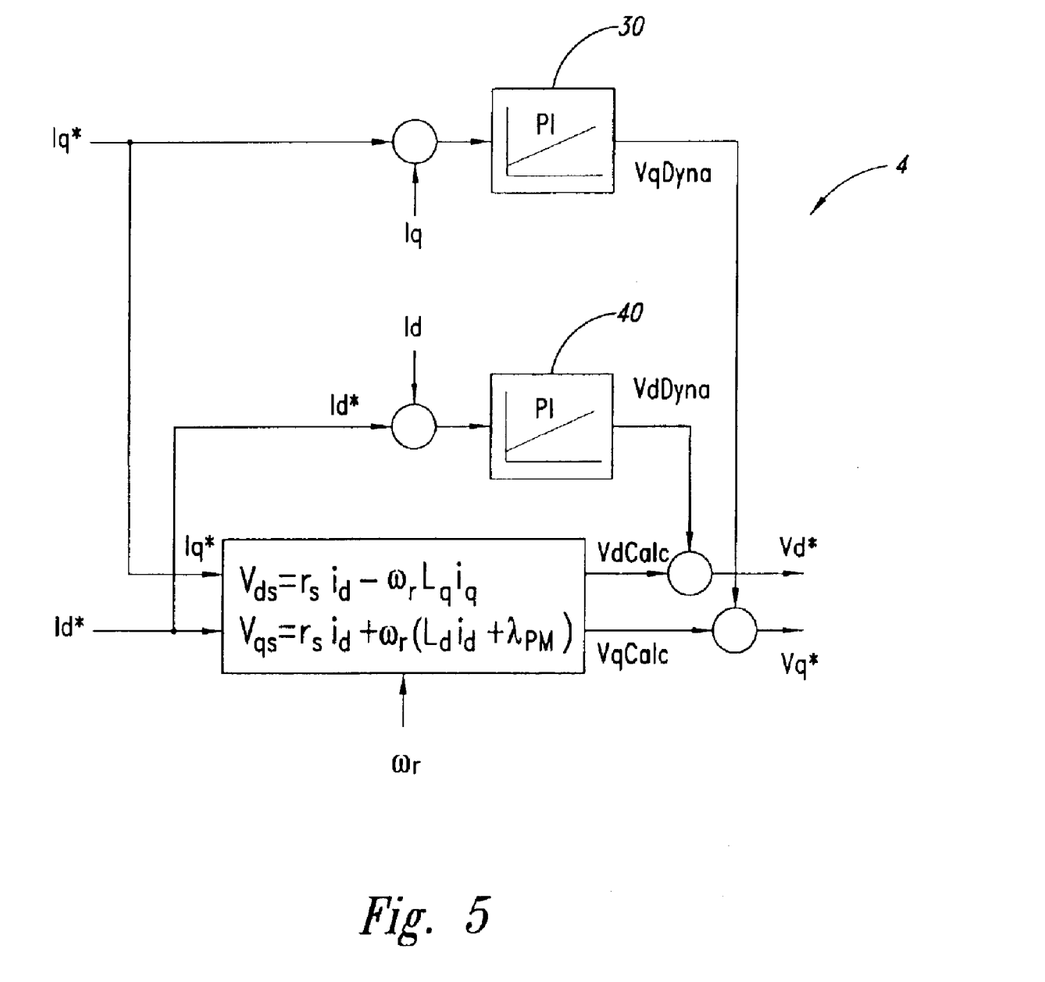
FIG. 5 is a block diagram of another feature of the present invention showing a combined feedforward and feedback calculation of the commanded dq voltage subsystem according to one embodiment of the present invention.

To improve the system's transient performance, as well as to account for the IGBT voltage drops and dead-times, third and fourth PI controllers 30 and 40 (FIG. 5) are implemented. The outputs VqDyna and VdDyna of these controllers 30, 40 are combined with the feed-forward voltages, VdCalc and VqCalc, to produce the required inverter voltage vector. FIG. 5 details the current regulator for the PM (i.e., reference d-q voltage subsystem 4), which contains the feedback and feed-forward terms described above.

Flux Current Calculation

Figure 6:
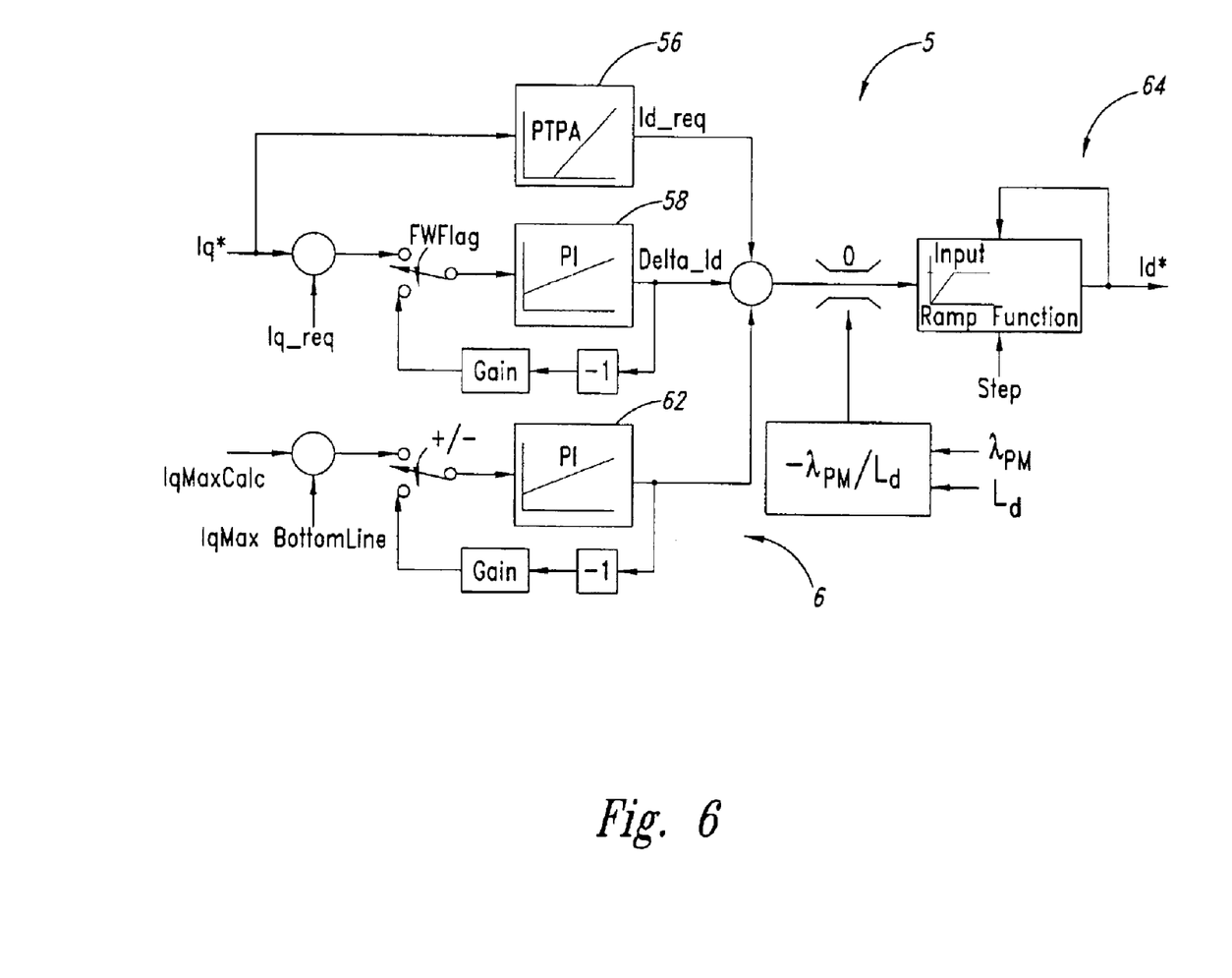
FIG. 6 is a block diagram of the flux current command ($i_d$*) calculation subsystem according to one embodiment of the present invention.

FIG. 6 shows a flux current command subsystem 5 and a maximum torque current subsystem 6. The flux current is determined based on the output of three PI controllers 56, 58, 62, employing three factors, respectively: 1) PTPA, 2) Field weakening, and 3) Minimum threshold for IqMax. When a motor is operated in the constant torque region the PTPA method is applied to calculate the required flux current. However, as previously described when the PM motor is operated in the flux-weakening region, or constant power region, the PI controllers 58 and 62 are used to increase the magnitude of the flux current to obtain more torque. The maximum flux current is limited by the magnetic flux of the PM motor. To improve system stability, a ramp function 64 is used to apply the flux current.

Torque Current Calculation

As known, the PM torque is given as (6):

$$T_e=(3P/2)(\lambda_{PM}i_q+i_d i_q(L_d-L_q)). \quad (6)$$

For a given flux current, torque current can be calculated by:

$$i_q = \frac{2T_e}{3P(\lambda_{PM} + i_d(L_d - L_q))}. \quad (17)$$

Figure 7:
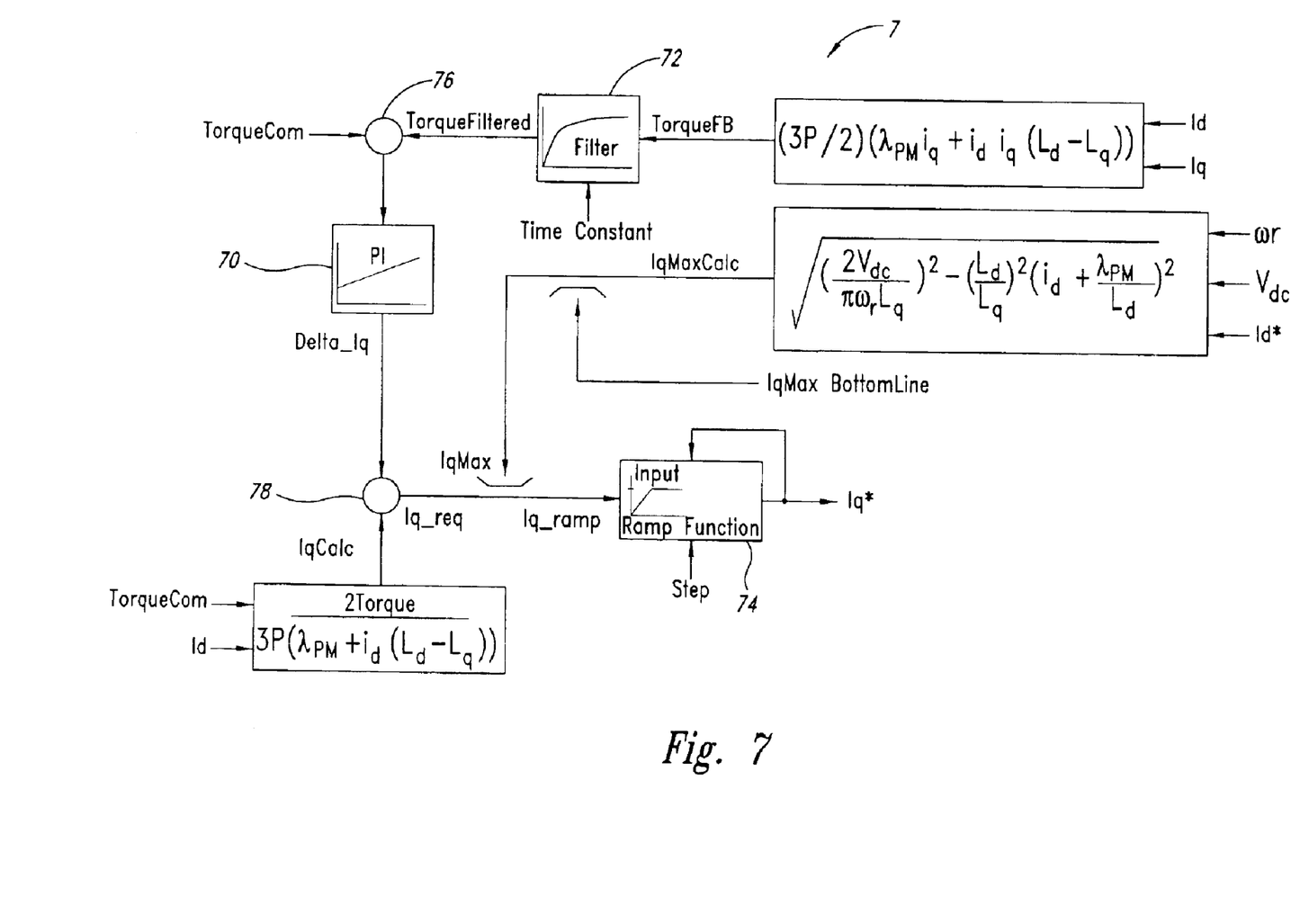
FIG. 7 is a block diagram of the torque current command ($i_q$*) calculation subsystem according to one embodiment of the present invention.
Figure 8A:
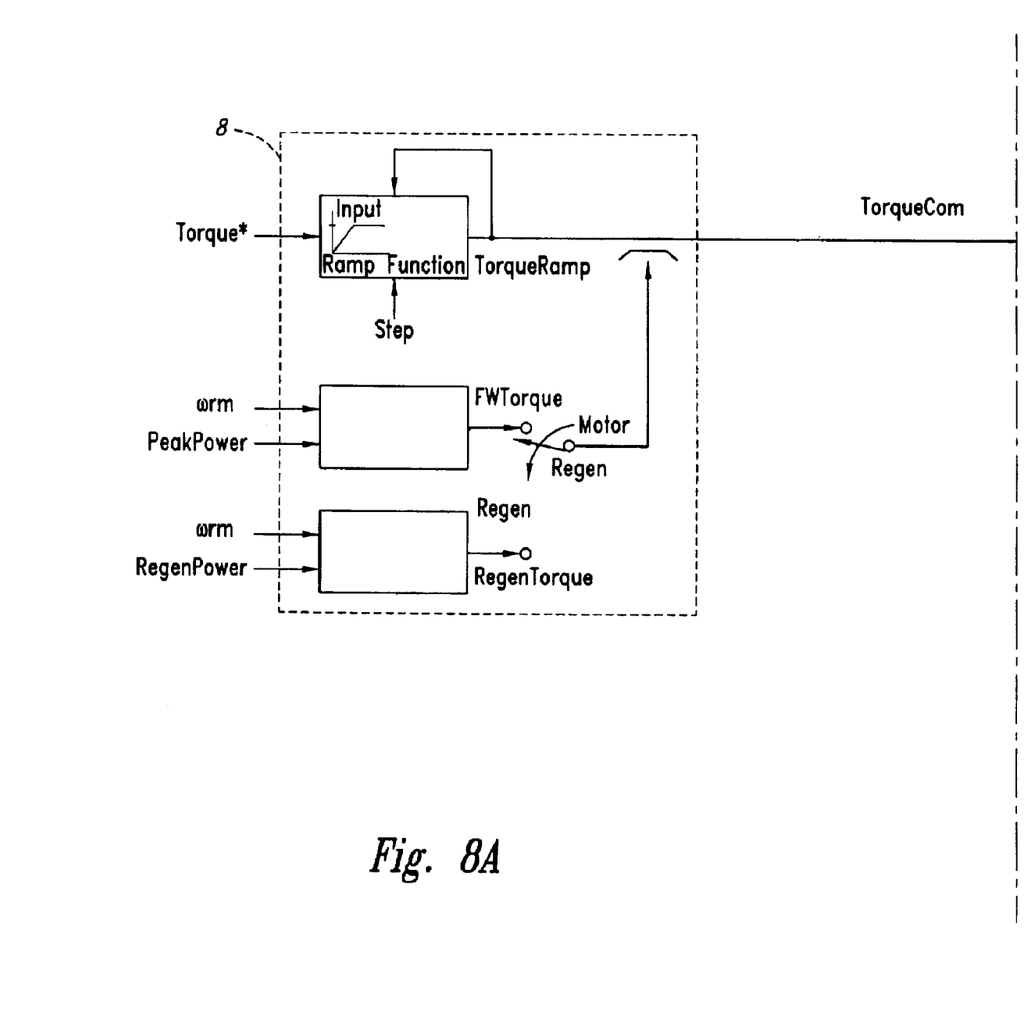
FIGS. 8A–8D are a block diagram of the overall control system according to one embodiment of the present invention.
Figure 8B:
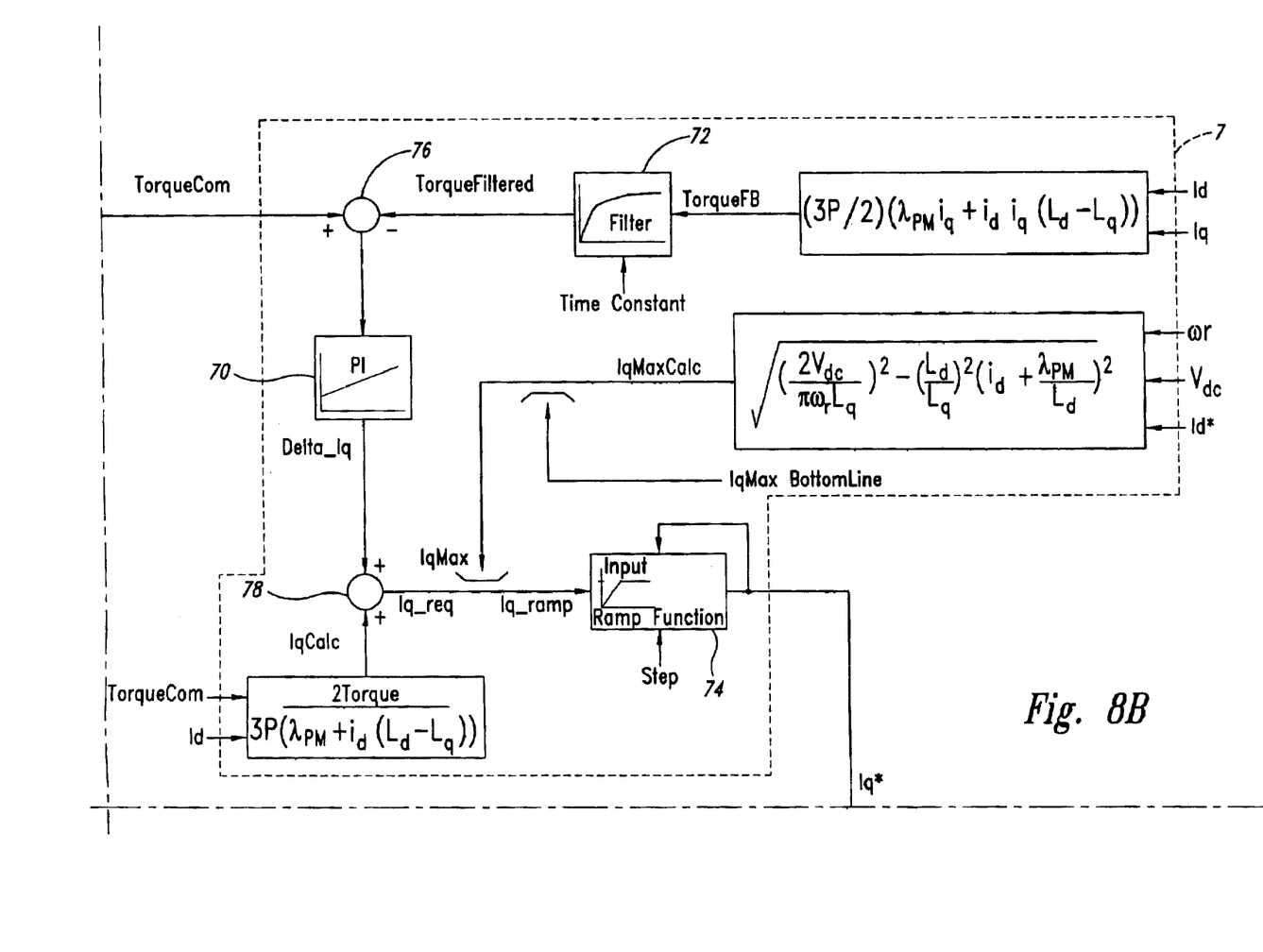
Figure 8C:
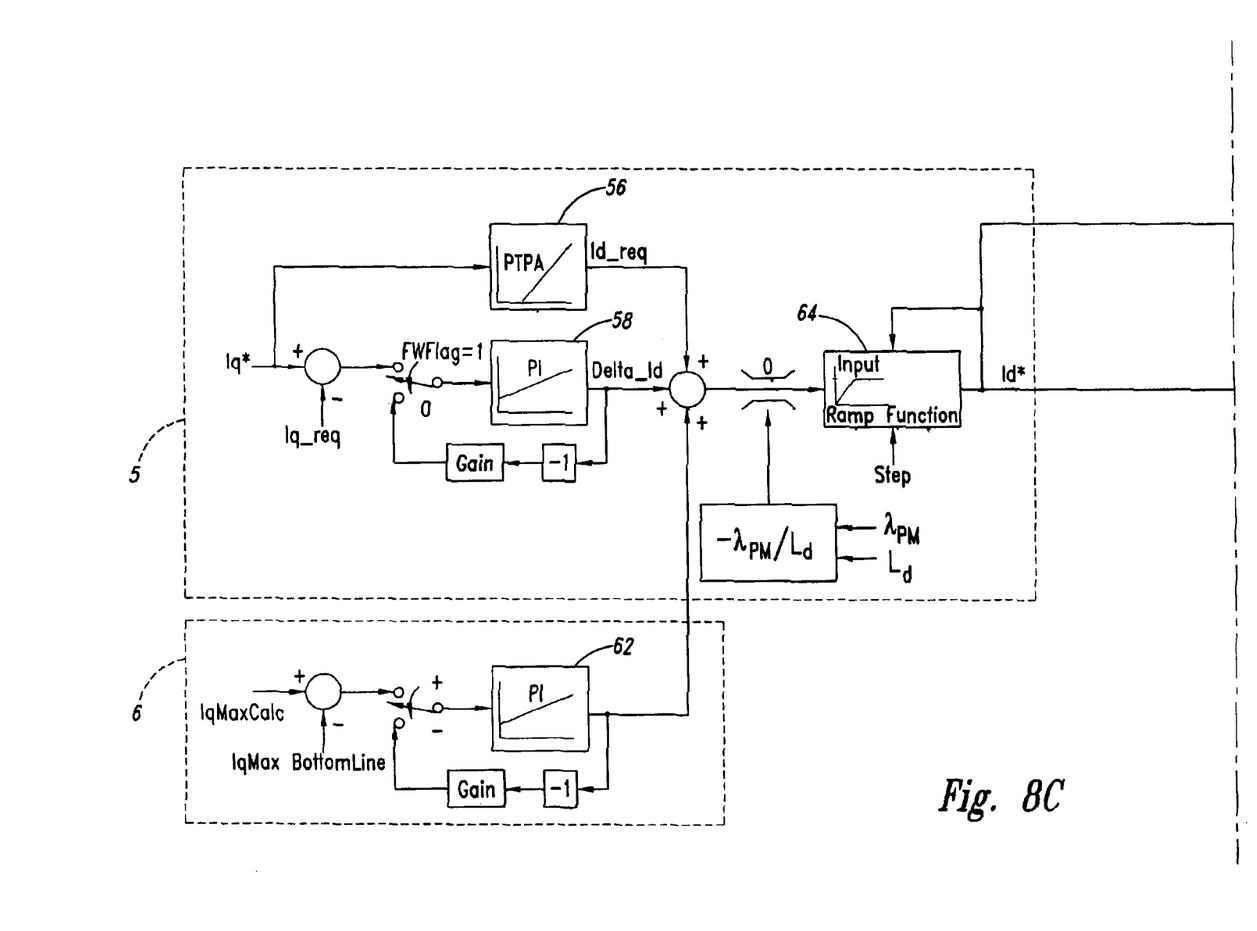
Figure 8D:
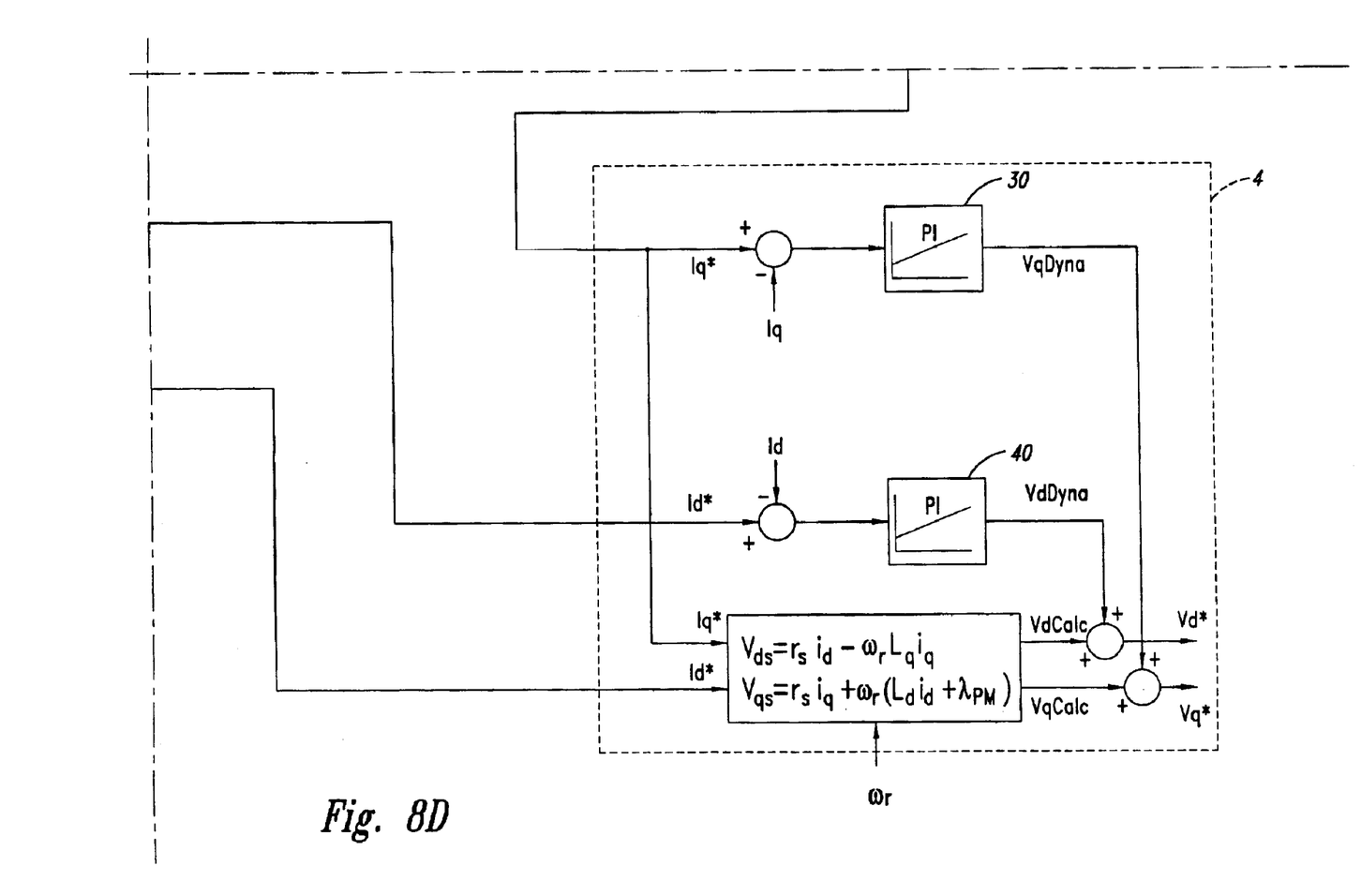

Since the PM motor parameters may vary, a PI controller 70 is employed in the torque current command subsystem 7 to improve the torque control accuracy, as shown in FIG. 7. A filter 72 and ramp function 74 have also been added to improve system performance.

FIG. 7 represents the closed loop torque controller which generates the reference $i_q^*$ current command. An adder or summer 78 adds both a feed-forward current command (IqCalc), based on user input, to a corrective current command (Delta_Iq), from the PI controller 70 operating on the error 76 between the commanded torque (TorqueCom) and an estimate of the actual torque (TorqueFiltered). The resulting q-axis current command (Iq_req) from the adder or summer is then compared to the maximum current allowed by the voltage limitation ellipse (IqMax) 10. The final current command variable (Iq*) is rate limited by applying a ramp function 74 to control the transient behavior.

FIGS. 8A–8D show a block diagram of the overall control system according to the present invention, including the subsystems of FIGS. 5–7, as well as additional subsystems.

Figure 9:
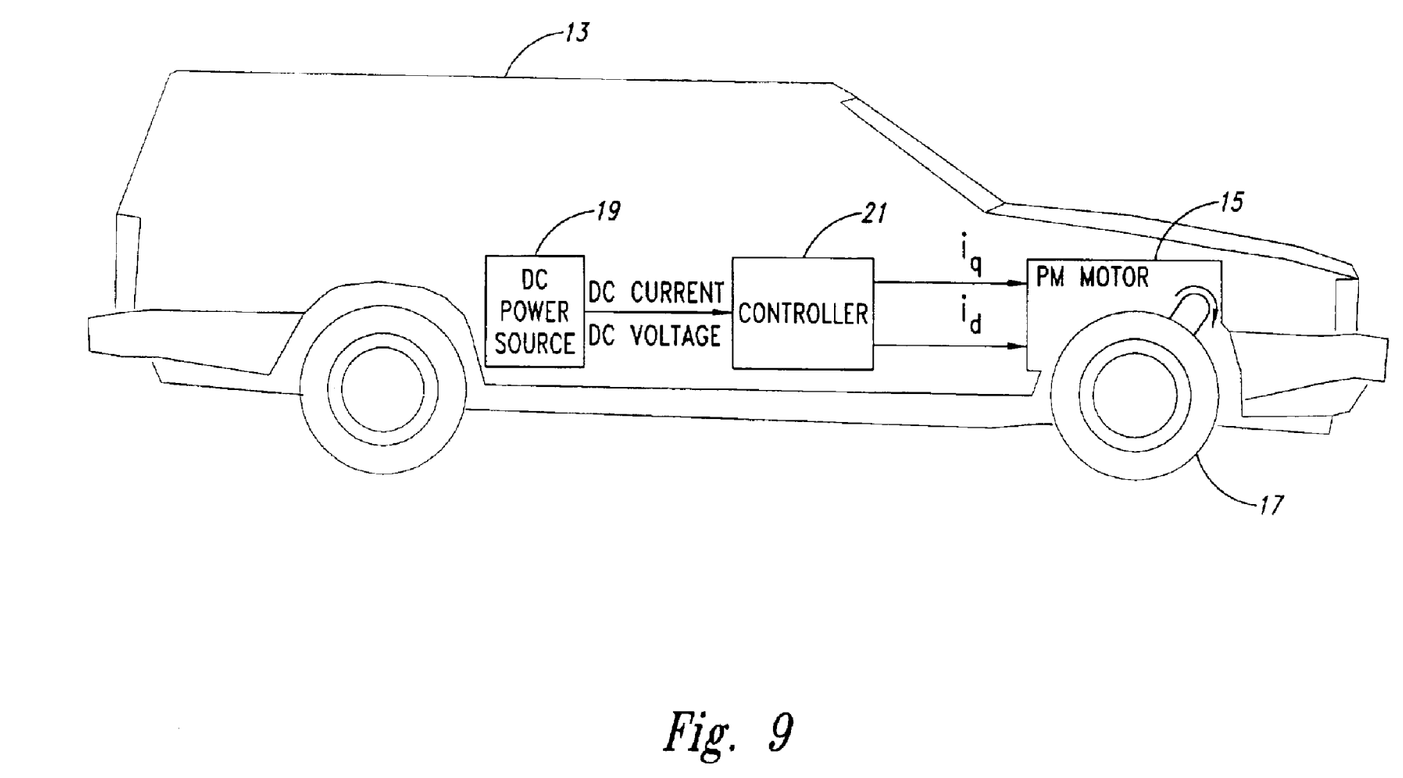
FIG. 9 is a schematic diagram of a vehicle including a DC power source, PM traction motor, and controller according to one illustrated embodiment of the present invention.

FIG. 9 shows a vehicle 13 having a PM traction motor 15 mechanically coupled to drive at least one wheel 17. The vehicle 13 includes a DC power source 19 such as a battery, fuel cell system, and/or super-capacitor, which is electrically coupled to the PM traction motor 15 by way of a motor controller 21 such as an analog circuit, digital circuit and/or programmed microprocessor. The motor controller 21 embodies control logic for supplying the torque and flux currents to the PM traction motor 15 in accordance with the PTPA and/or flux-weakening algorithms generally discussed above.

Although specific embodiments of, and examples for, the invention are described herein for illustrative purposes, various equivalent modifications can be made without departing from the spirit and scope of the invention, as will be recognized by those skilled in the relevant art.

The teachings provided herein of the invention can be applied to other motor control systems, not necessarily the PM motor control system generally described above. For example, the PM motor control system may be embodied in software, hardware, and/or firmware. Additionally, or alternatively, many of the methods and processes described above may include optional acts or steps, and additional act or steps may be added as will be recognized by those skilled in the relevant arts. Further, the acts or steps of many of the methods and processes described above, may be executed in a different order, as will be recognized by those skilled in the relevant arts. The motor control system can have a different organization than the illustrated embodiment, combining some functions and/or eliminating some functions.

These and other changes can be made to the invention in light of the above-detailed description. In general, in the following claims, the terms used should not be construed to limit the invention to the specific embodiments disclosed in the specification and the claims, but should be construed to include all motor control systems and methods that operate in accordance with the claims. Accordingly, the invention is not limited by the disclosure, but instead its scope is to be determined entirely by the following claims.

We claim:

1. A method for controlling motor torque of a motor in a vehicle, comprising:

determining a maximum torque current that a DC source can supply to the motor;

determining a present flux weakening current;

determining a minimum threshold for the determined maximum torque current, below which a commanded torque current should not fall;

increasing a flux current to the motor if a commanded torque requires higher current than the determined maximum torque current that the DC source can supply, by adding to the flux current the output of a first proportional-plus-integral controller operating on a difference between the commanded torque current and the determined maximum torque current that the DC source can supply; and further increasing the flux current to the motor if the determined maximum torque current that the DC source can supply is less than the minimum threshold for the determined maximum torque current, by adding to the flux current the output of a second proportional-plus-integral controller operating on a difference between the determined maximum torque current that the DC source can supply and the determined minimum threshold for the determined maximum torque current.

2. The method of claim 1 wherein the maximum torque current that the DC source can supply to the motor is determined via the following formula:

$$i_q^{Max} = \sqrt{\left(\frac{V_{DC}}{\omega_r L_q}\right)^2 - \left(\frac{L_d}{L_q}\right)^2\left(i_d^* + \frac{\lambda_{PM}}{L_d}\right)^2},$$

where $i_q^{Max}$ is the maximum torque current, $V_{DC}$ is the DC source voltage, $\omega_r$ is a synchronous speed, $L_q$ is a q-axis stator inductance, $L_d$ is a d-axis stator inductance, $i_d^*$ is a commanded flux current, and $\lambda_{PM}$ is a permanent magnet flux.

3. A method to control a motor powered at least in part by a DC source, the method comprising:

determining a maximum torque current that the DC source can supply to the motor under a present set of operating parameters;

determining a minimum threshold for the maximum torque current;

determining whether the determined maximum torque current is greater than the determined minimum threshold for the maximum torque current;

determining a torque current limit based on an outcome of the determination of whether the determined maximum torque current is greater than the determined minimum threshold for the determined maximum torque current;

determining whether a demanded torque current exceeds the determined torque current limit; and adjusting a flux current supplied to the motor based on an outcome of the determination of whether the demanded torque current exceeds the determined torque current limit.

4. The method of claim 3 wherein the maximum torque current that the DC source can supply to the motor under the present set of operating parameters is determined as:

$$i_q^{Max} = \sqrt{\left(\frac{V_{DC}}{\omega_r L_q}\right)^2 - \left(\frac{L_d}{L_q}\right)^2\left(i_d^* + \frac{\lambda_{PM}}{L_d}\right)^2},$$

where $i_q^{Max}$ is the maximum torque current, $V_{DC}$ is the DC source voltage, $\omega_r$ is a synchronous speed, $L_q$ is a q-axis stator inductance, $L_d$ is a d-axis stator inductance, $i_d^*$ is a commanded flux current, and $\lambda_{PM}$ is a permanent magnet flux.

5. The method of claim 3 wherein determining a torque current limit based on an outcome of the determination of whether the determined maximum torque current is greater than the minimum threshold for the determined maximum torque current includes increasing the flux current supplied to the motor if the determined maximum torque current is not greater than the minimum threshold for the determined maximum torque current.

6. The method of claim 3 wherein determining a torque current limit based on an outcome of the determination of whether the determined maximum torque current is greater than the minimum threshold for the determined maximum torque current includes increasing the flux current supplied to the motor based on an output of a first proportional-plus-integral controller if the determined maximum torque current is not greater than the minimum threshold for the determined maximum torque current.

7. The method of claim 3 wherein determining a torque current limit based on an outcome of the determination of whether the determined maximum torque current is greater than the minimum threshold for the determined maximum torque current includes maintaining the flux current supplied to the motor based on an output of a first proportional-plus-integral controller if the determined maximum torque current is greater than the minimum threshold for the determined maximum torque current.

8. The method of claim 3 wherein adjusting a flux current supplied to the motor based on an outcome of the determination of whether the demanded torque current exceeds the determined torque current limit includes increasing the flux current supplied to the motor.

9. The method of claim 3 wherein adjusting a flux current supplied to the motor based on an outcome of the determination of whether the demanded torque current exceeds the determined torque current limit includes increasing the flux current supplied to the motor based on an output of a proportional-plus-integral controller if the demanded torque current exceeds than the determined torque current limit.

10. The method of claim 3 wherein determining a torque current limit based on an outcome of the determination of whether the maximum torque current is greater than the minimum threshold for the maximum torque current includes increasing the flux current supplied to the motor if the maximum torque current is not greater than the minimum threshold for the maximum torque current, and wherein adjusting a flux current supplied to the motor based on an outcome of the determination of whether the demanded torque current exceeds the determined torque current limit includes further increasing the flux current supplied to the motor.

11. The method of claim 3 wherein determining a torque current limit based on an outcome of the determination of whether the maximum torque current is greater than the minimum threshold for the maximum torque current includes increasing the flux current supplied to the motor based on an output of a first proportional-plus-integral controller if the maximum torque current is not greater than the minimum threshold for the maximum torque current, and wherein adjusting a flux current supplied to the motor based on an outcome of the determination of whether the demanded torque current exceeds the determined torque current limit includes further increasing the flux current supplied to the motor based on an output of a second proportional-plus-integral controller if the demanded torque current is greater than the determined torque current limit.

12. A method for controlling a motor powered at least in part by a DC source, the method comprising:
    determining a torque current and a flux current according to a peak torque per ampere algorithm;
    determining whether the motor is operating in one of a constant torque region and a constant power region;
    supplying the determined torque current and the determined flux current to the motor if the motor is operating in the constant torque region;
    determining an adjusted flux current according to a flux-weakening algorithm, if the motor is operating in the constant power region; and
    supplying the adjusted flux current to the motor, if the motor is operating in the constant power region, wherein the determining an adjusted flux current comprises:
    determining a maximum torque current that the DC source can supply to the motor;
    determining a minimum threshold for the determined maximum torque current;
    increasing the flux current supplied to the motor if a torque demand requires higher current than the determined maximum torque current that the DC source can supply; and
    further increasing the flux current supplied to the motor if the determined maximum torque is less than the determined minimum threshold for the determined maximum torque current.

13. The method of claim 12 wherein determining a maximum torque current that the DC source can supply to the motor comprises:
    determining the maximum torque current according to:

$$i_q^{Max} = \sqrt{\left(\frac{V_{DC}}{\omega_r L_q}\right)^2 - \left(\frac{L_d}{L_q}\right)^2\left(i_d^* + \frac{\lambda_{PM}}{L_d}\right)^2},$$

where $i_q^{max}$ is the maximum torque current, $V_{DC}$ is the DC source voltage, $\omega_r$ is a synchronous speed, $L_q$ is a q-axis stator inductance, $L_d$ is a d-axis stator inductance, $i_d^*$ is a commanded flux current, and $\lambda_{PM}$ is a permanent magnet flux.

14. A system for controlling motor torque of a motor in an electric vehicle having at least one DC source, comprising:
    means for computing a maximum torque current that can be supplied to the motor by the DC source;
    means for computing a present flux weakening current of the motor;
    means for setting a minimum threshold of the computed maximum torque current, below which a commanded torque current should not fall;
    means for increasing a flux current if the commanded torque current requires a higher current than the computed maximum torque current that the DC source can supply to the motor by subtracting from the flux current an output of a first proportional-plus-integral controller operating on the difference between the commanded torque current and the determined maximum torque current that the DC source can supply; and
    means for increasing the flux current further, if the determined maximum torque current that the DC source can supply is less than the minimum threshold of the maximum torque current, by subtracting from the flux current an output of a second proportional-plus-integral controller operating on the difference between the determined maximum torque current that the DC source can supply and the minimum threshold of the determined maximum torque current.

15. The system of claim 14 wherein the means for computing a maximum torque current that that the DC source can supply to the motor includes control logic for calculating the maximum torque current as:

$$i_q^{Max} = \sqrt{\left(\frac{V_{DC}}{\omega_r L_q}\right)^2 - \left(\frac{L_d}{L_q}\right)^2\left(i_d^* + \frac{\lambda_{PM}}{L_d}\right)^2},$$

where $i_q^{Max}$ is the maximum torque current, $V_{DC}$ is the DC source voltage, $\omega_r$ is a synchronous speed, $L_q$ is a q-axis stator inductance, $L_d$ is a d-axis stator inductance, $i_d^*$ is a commanded flux current, and $\lambda_{PM}$ is a permanent magnet flux.

16. A motor control system to control a torque current and a flux current supplied to a permanent magnet motor from a DC power source, the motor control system comprising:

a maximum torque current subsystem to adjust a maximum torque current limit when a maximum torque current that the DC power source can supply to the motor is below a minimum limit of the maximum torque current;

a flux current command subsystem coupled to receive the maximum torque current limit from the maximum torque current subsystem and to provide a flux current command in response; and a reference d-q voltage subsystem coupled to receive the flux current command from the flux current command subsystem and a torque voltage reference and a flux voltage reference.

17. The motor control system of claim 16, further comprising:

a torque command subsystem to produce a torque demand value; and a torque current command subsystem coupled to receive the torque demand value from the torque command subsystem and to supply a torque current command to the reference d-q voltage subsystem.

18. The motor control system of claim 16 wherein the maximum torque current subsystem includes a controller coupled to the flux current command subsystem to increase the flux current command when the maximum torque current that the DC source can supply is below the minimum limit of the maximum torque current.

19. The motor control system of claim 16 wherein the flux current command subsystem includes a controller coupled to increase the flux current command when a demanded torque current exceeds the maximum torque current limit.

20. The motor control system of claim 16 wherein the flux current command subsystem includes a first controller coupled to increase the flux current command when a demanded torque current exceeds the maximum torque current limit, and wherein the maximum torque current subsystem includes a second controller coupled to the flux current command subsystem to increase the flux current command when the maximum torque current that the DC source can supply is below the minimum limit of the maximum torque current.

21. The motor control system of claim 16 wherein the motor control system takes the form of at least one of an analog circuit, a digital circuit and a programmed microprocessor.

22. A system for an electric vehicle, comprising:

a permanent magnet traction motor; and a motor control system to control a torque current and a flux current supplied to the permanent magnet traction motor from a DC power source, the motor control system including:

a maximum torque current subsystem to adjust a maximum torque current limit when a maximum torque current that the DC power source can supply to the permanent magnet motor is below a minimum limit of the maximum torque current;

a flux current command subsystem coupled to receive the maximum torque current limit from the maximum torque current subsystem and to provide a flux current command in response; and a reference d-q voltage subsystem coupled to receive the flux current command from the flux current command subsystem and a torque voltage reference and a flux voltage reference.

23. The system of claim 22 wherein the motor control system further includes:

a torque command subsystem to produce a torque demand value; and a torque current command subsystem coupled to receive the torque demand value from the torque command subsystem and to supply a torque current command to the reference d-q voltage subsystem.

24. The system of claim 22 wherein the flux current command subsystem includes a first controller coupled to increase the flux current command when a demanded torque current exceeds the maximum torque current limit, and wherein the flux current command subsystem includes a second controller coupled to the maximum torque current subsystem to increase the flux current command when the maximum torque current that the DC source can supply is below the minimum limit of the maximum torque current.

25. The system of claim 22 wherein the permanent magnet traction motor is a surface permanent magnet motor.

26. The system of claim 22 wherein the permanent magnetic motor is an interior permanent magnetic motor.

27. A vehicle, comprising:

at least one drive wheel;

a DC power source;

a permanent magnet motor coupled to drive the at least one drive wheel; and a motor control system coupled between the DC power source and the permanent magnet motor, the motor control system having control logic that causes a torque current and a flux current to be supplied to the permanent magnet motor from the DC power source, by:

determining a maximum torque current that the DC source can supply to the motor under a present set of operating parameters;

determining a minimum threshold for the maximum torque current;

determining whether the maximum torque current is greater than the minimum threshold for the maximum torque current;

determining a torque current limit based on an outcome of the determination of whether the maximum torque current is greater than the minimum threshold for the maximum torque current;

determining whether a demanded torque current exceeds the determined torque current limit; and adjusting the flux current supplied to the motor based on an outcome of the determination of whether the demanded torque current exceeds the determined torque current limit.

28. The vehicle of claim 27 wherein the control logic determines a torque current limit based on an outcome of the determination of whether the maximum torque current is greater than the determined minimum threshold for the determined maximum torque current by increasing the flux current supplied to the motor if the determined maximum torque current is not greater than the determined minimum threshold for the determined maximum torque current, and wherein the control logic adjusts the flux current supplied to the motor based on an outcome of the determination of whether the demanded torque current exceeds the determined torque current limit by further increasing the flux current supplied to the motor.

29. The vehicle of claim 27 wherein the DC power source is at least one of a battery, a fuel cell system and a super-capacitor.

30. The vehicle of claim 27, further comprising:

an internal combustion engine.

* * * * *